UNITED STATES PATENT OFFICE.

GEORGE B. SNOW, OF BUFFALO, NEW YORK.

PROCESS OF VULCANIZING RUBBER DENTURES.

SPECIFICATION forming part of Letters Patent No. 454,079, dated June 16, 1891.

Application filed September 29, 1890. Serial No. 366,553. (No specimens.)

*To all whom it may concern:*

Be it known that I, GEORGE B. SNOW, a citizen of the United States, residing at Buffalo, in the county of Erie and State of New York, have invented new and useful Improvements in Processes of Vulcanizing Rubber Dentures, of which the following is a specification.

In the mounting of artificial teeth upon rubber plates the plates are formed in molds having gateways to permit the escape of any excess of rubber, the mold being packed full of the vulcanizable compound and then closed, either by bolts or in a press. The mold is subjected to heat for softening the rubber, thus enabling it to be closed without injury either to itself or to its contents; and when closed it is placed in the vulcanizer and subjected to a temperature of about 320° Fahrenheit for the purpose of hardening or vulcanizing the rubber. In consequence of the increase of temperature the rubber expands and a certain portion thereof is forced into the gateways, the outward flow continuing so long as the temperature rises. When the vulcanizing temperature is reached, it is maintained for, say, one hour, and during this time the rubber hardens, becoming more dense and suffering a perceptible diminution in its bulk. This shrinkage is inherent to the process of vulcanization and occurs with all rubbers, unless they are overheated and thus made spongy in the center. The result of shrinkage is that vacancies exist under the teeth, into which particles of food find access and decompose, which decomposition gives rise to bad odors, affecting the breath of the wearer, which is obviously objectionable; and, besides, the rubber often shrinks away from and fails to properly hold the platinum pins by which the teeth are secured to the plate or denture, and the dentist is often annoyed by finding the teeth loose upon the plate, and he is sometimes compelled to make the plate over for this reason. I have discovered a method or process of procedure by which these objections are avoided; and it consists, essentially, in securing the proper quantity of rubber in the mold, either by closing it incompletely before vulcanizing or by closing it at about 212° and then relieving it from all constraint during a part of the whole of the vulcanizing process, thus allowing the contents of the mold to open it by expansion by heat instead of flowing into the gateways. Then after the shrinkage from vulcanization is concluded pressure is applied to fully close the mold and force the rubber into the vacuities caused by the said shrinkage, and this pressure is continued until the rubber has become cold, or at least too cool to flow and change its shape.

In carrying out this process any ordinary dental vulcanizer may be employed, but is more expeditiously performed by using one which has a screw-press combined with it, as, for instance, the one patented by Edward B. Crane August 27, 1889, or the one patented by H. M. Edson May 25, 1875. I prefer the former of these, as it has a spring interposed between the screw-press and mold, giving a gradual and equable pressure.

To vulcanize a plate by this process in an ordinary vulcanizer, the mold provided with the usual gateways is packed with rubber compound and then warmed by boiling in water or otherwise to soften the rubber and closed. It is then placed in the vulcanizer, all pressure upon it being relaxed, so that it is free to open as its contents expand as the heat rises. After a certain time, when the shrinkage of the rubber is completed or nearly completed, the vulcanizer is opened and the mold placed in a spring-clamp and pressure applied to it sufficient to close it when the rubber is softened. The mold and clamp are then replaced in the vulcanizer and the temperature again raised to the vulcanizing-point, the vulcanizing process completed, and they are then allowed to cool slowly; or thin pieces of sheet metal (tin-foil, for example) may be interposed to prevent the complete closing of the mold, and allowance thus be made for shrinkage, the mold being firmly held to prevent its opening while the rubber is vulcanizing. After shrinkage is nearly or quite completed the flask is removed from the vulcanizer, the thin metal strips removed, and it is then placed in a spring-clamp and reheated exactly in the manner before described.

For an ordinary upper plate the thickness of the strips interposed, as described, will depend upon the amount of rubber in the plate and the surface exposed to pressure, and will vary from one two-hundredths to one one-hundredth of an inch. For lower plates they should be thicker—from one one-hundredth to one-fiftieth of an inch.

The shrinkage of the rubber takes place more rapidly than its hardening, and when the time of vulcanizing is one hour shrinkage is practically over at the end of forty minutes. I prefer that time, or two-thirds the time of vulcanization, as the time to close the mold and repress the plate, as the rubber is softer and flows more readily then than when fully vulcanized, while it is too tough and viscid to flow into the gateways. I do not limit myself to this time, however, as it is possible to remold the plate at the conclusion of the vulcanizing process.

If a vulcanizer is used for this process which has a screw-press combined with it, the mold is placed in it and closed when the temperature reaches or slightly exceeds 212°. The pressure upon it is then relaxed, so that it can open as its contents expand and re-applied when shrinkage is completed. As this can be done without removing the mold from the vulcanizer, or even opening it, the process becomes a continuous operation, easily accomplished, and with but small additional expenditure of time as compared with the ordinary method of vulcanizing. The result in either case is a plate without crevices under or around the teeth, and they are more firmly held in position than heretofore.

In the ordinary method of vulcanizing the moment the vulcanizing-point is reached and the temperature becomes stationary the shrinkage of the rubber begins, the expansive pressure of the rubber is relieved, and in a few moments the mass of rubber becomes too small to fill the flask or mold, and as it adheres to the surface of the plaster it is drawn away from the teeth and pins to which it has less adhesion. The rubber will not pass from the narrow gateways back into the mold to fill the vacuity except possibly to a very limited extent. The effects of shrinkage may be seen and have often been observed by those who in the process of preparing rubber plates have occasion to remove a block of teeth therefrom. If there is any considerable amount of rubber under the teeth, a space will be found between the two into which a thin instrument can be easily passed. This space is usually a receptacle for particles of food, which decompose and therefore render the plate objectionable. This is avoided by my invention, while the completed article is distinctive and characteristic, in that a denture made according to my invention if dropped upon a table gives a ringing sound, while usually the denture made by the ordinary process rattles as though cracked.

By closing the flask or mold at a temperature of about 212° Fahrenheit, vulcanizing the rubber with the pressure on the mold-sections relieved and then reclosing the flask or mold and causing the rubber to flow and fill all vacancies, I avoid all the defects and annoyances hereinbefore mentioned and secure perfect vulcanization of a dental plate.

Having thus described my invention, what I claim is—

1. The process herein described of vulcanizing rubber dentures, which consists in packing the flask or mold and closing it at a temperature of about 212° Fahrenheit, releasing the pressure prior to subjecting the flask or mold to the vulcanizing temperature and allowing it to part as its contents expand by heat, vulcanizing the plate, and subsequently reclosing the flask or mold under pressure and heat, causing the shrunken mass of rubber to fill the vacancies incident to the shrinkage, substantially as described.

2. The process herein described of vulcanizing rubber dentures, consisting in partially closing the flask or mold, making allowance thereby for shrinkage, and after vulcanizing the rubber subjecting the mold to heat and pressure to close it and cause the shrunken mass of rubber to fill the vacuities therein, substantially as described.

In testimony whereof I have affixed my signature in presence of two witnesses.

GEORGE B. SNOW.

Witnesses:
WILLIAM GRAM, Jr.,
JOHN E. ROBIE.